US008219502B2

(12) United States Patent
Gold et al.

(10) Patent No.: US 8,219,502 B2
(45) Date of Patent: Jul. 10, 2012

(54) AUTOMATED INTERVIEW SYSTEMS AND METHODS

(75) Inventors: David Mark Gold, Highlands Ranch, CO (US); Daniel R. Montoya, Boulder, CO (US); James Mooney, Denver, CO (US)

(73) Assignee: References-Online, Inc., Denver, CO (US)

( * ) Notice: Subject to any disclaimer, the term of this patent is extended or adjusted under 35 U.S.C. 154(b) by 254 days.

(21) Appl. No.: 12/611,797

(22) Filed: Nov. 3, 2009

(65) Prior Publication Data

US 2010/0114791 A1      May 6, 2010

Related U.S. Application Data

(60) Provisional application No. 61/110,945, filed on Nov. 3, 2008.

(51) Int. Cl.
*G06Q 10/00* (2012.01)
(52) U.S. Cl. ............... 705/321; 705/1.1; 705/320
(58) Field of Classification Search ............... None
See application file for complete search history.

(56) References Cited

U.S. PATENT DOCUMENTS

| 6,311,190 B1 | 10/2001 | Bayer et al. |
| 2002/0156673 A1 | 10/2002 | Barker |
| 2007/0219849 A1 | 9/2007 | Edwards et al. |

FOREIGN PATENT DOCUMENTS

| WO | WO 01-48660 | 5/2001 |
| WO | WO 02-44829 | 6/2002 |

OTHER PUBLICATIONS

PCT Search Report, 11 pages, dated May 14, 2010.
PCT Written Opinion of International Searching Authority, 5 pages, dated May 14, 2010.

*Primary Examiner* — Jonathan Ouellette
(74) *Attorney, Agent, or Firm* — Trenner Law Firm, LLC; Mark D. Trenner

(57) ABSTRACT

Automated interview systems and methods are disclosed. An exemplary method comprises selectively presenting interview questions based on user input to at least one interviewee identified by a user, and receiving answers from the at least one interviewee in response to presenting the interview questions. The method further comprises compiling the interview questions and received answers as a recorded interview to assist the user to build online references for the user's products or services.

15 Claims, 7 Drawing Sheets

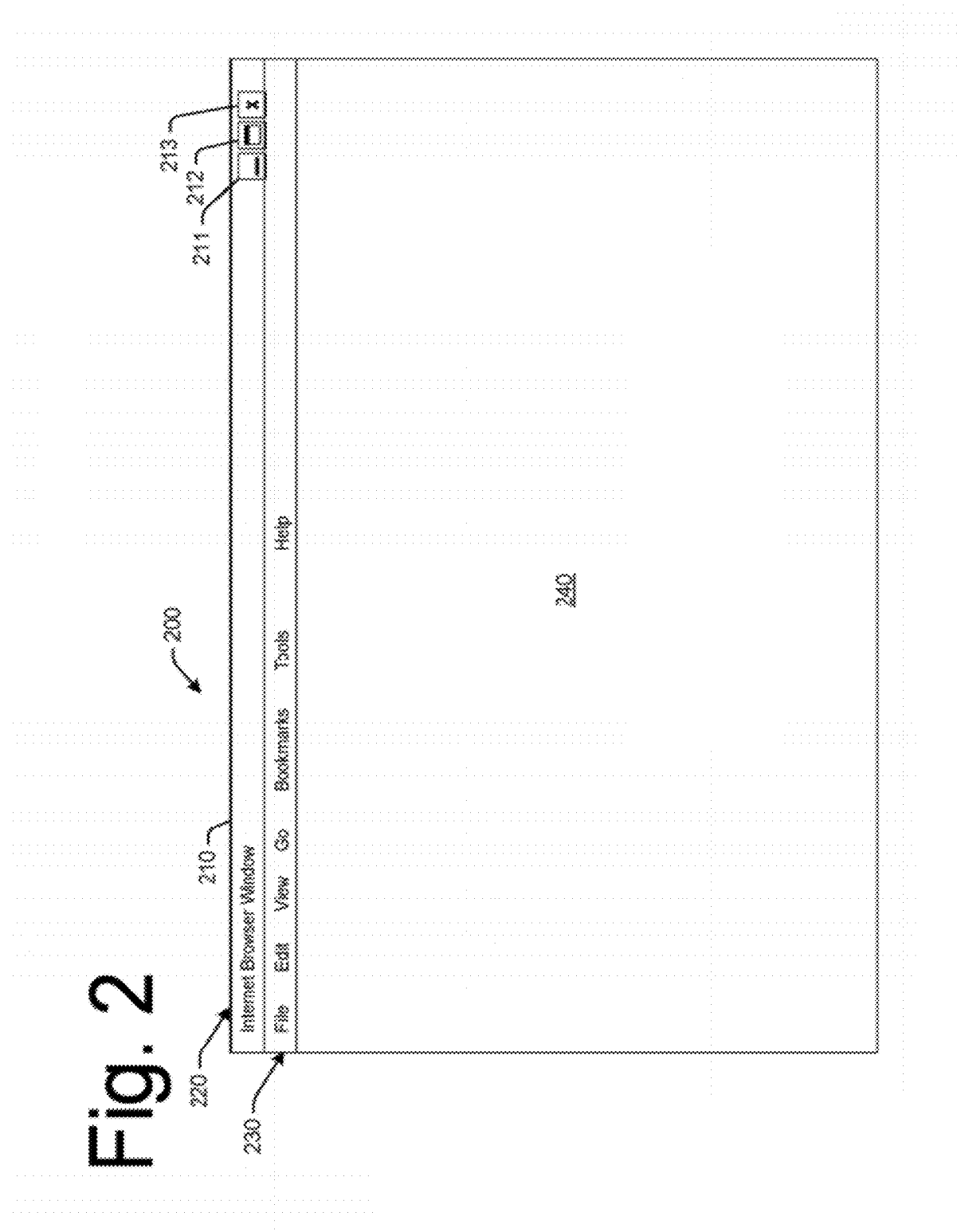

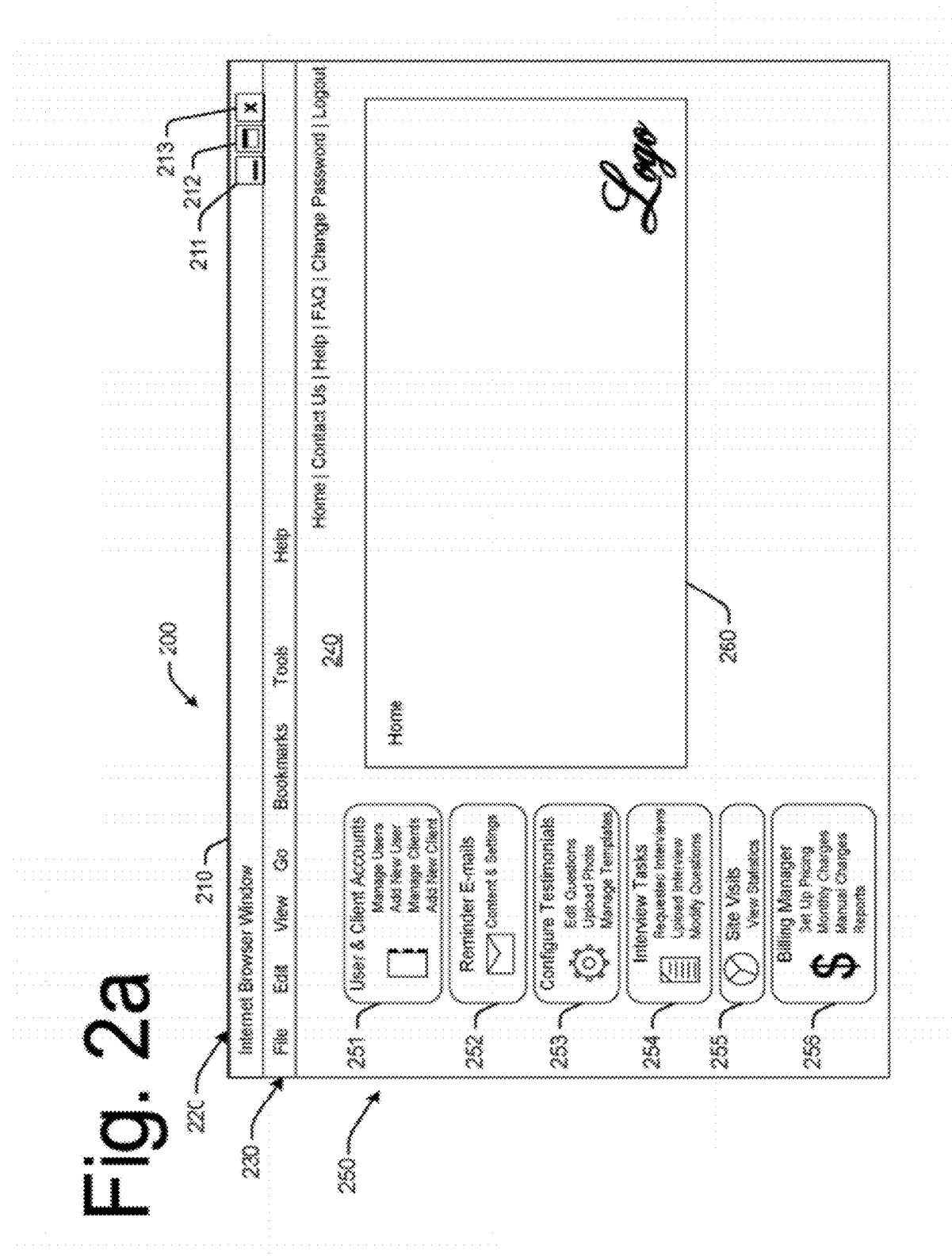

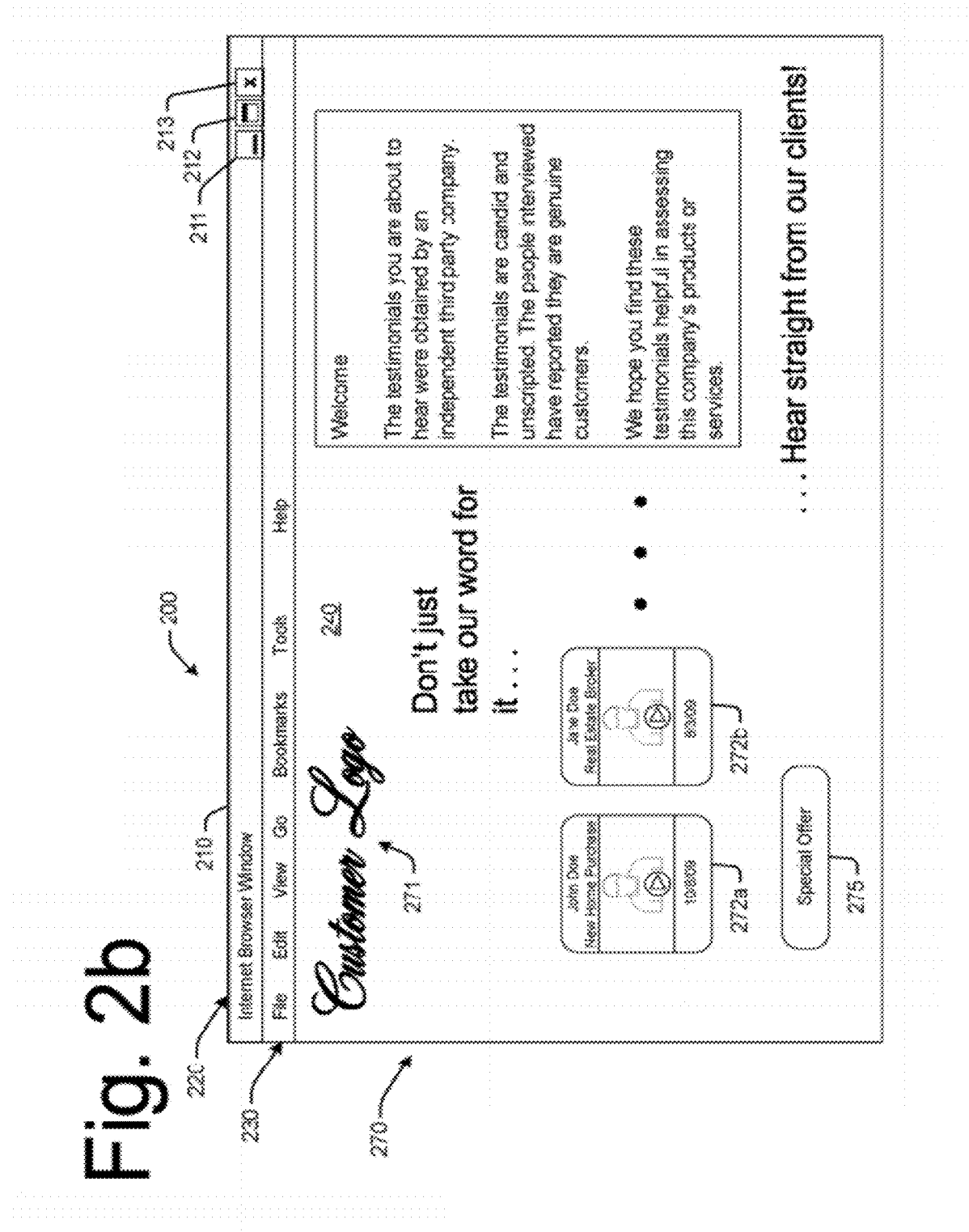

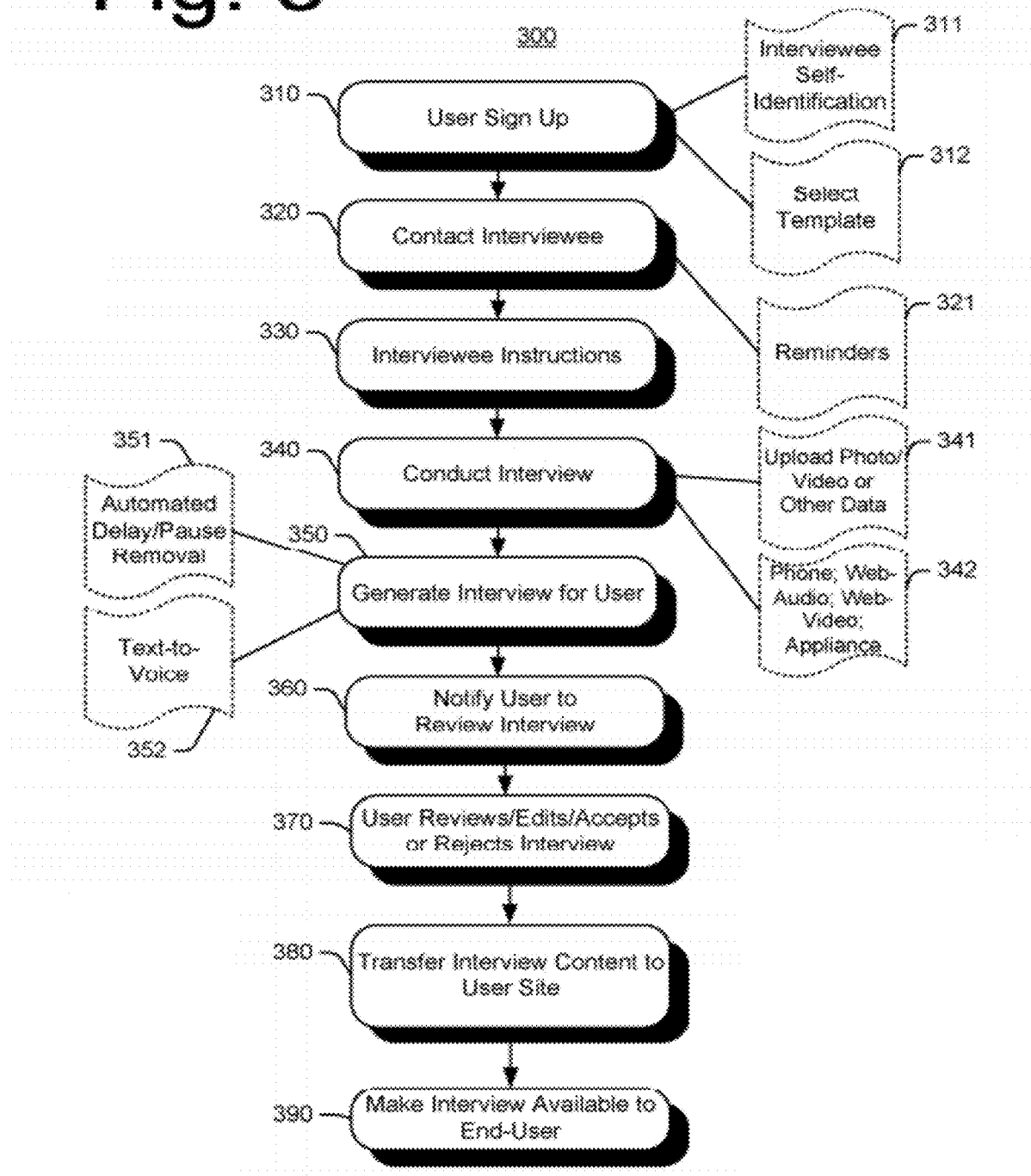

AUTOMATED INTERVIEW SYSTEMS AND METHODS

PRIORITY CLAIM

This application claims priority to U.S. Provisional Application No. 61/110,945, filed Nov. 3, 2008, which is hereby incorporated by reference as though fully set forth herein.

BACKGROUND

There are various applications existing where a series of verbal questions are posed to an interviewee and the questions and answers are recorded in audio or video format and then made available via the World Wide Web. To accomplish this task traditionally requires the involvement of at least two people, and as many as one person each to prepare the interview, to conduct the interview, to record the interview, and of course to be interviewed. Then the recording must be manually uploaded to a web site and a web page created to present the interview. This is a very people-intensive task, increasing time and cost.

SUMMARY

Systems and methods described herein implement a computer platform (e.g., software, firmware, and/or other program code) to automate the interview collection process and the creation of a corresponding web page. The systems and methods enable a person or company or other entity (referred to generally as a "user") to have interviews conducted, recorded and created into compelling web pages with an unlimited number of interviewees after a one-time online setup process by the user. The user does not have to conduct the interview nor interact directly with the interviewee(s) nor does any other human being.

An exemplary method comprises selectively presenting interview questions based on user input to at least one interviewee identified by a user, and receiving answers from the at least one interviewee in response to presenting the interview questions. The method further comprises compiling the interview questions and received answers as a recorded interview to enable the user to have online references for the user's products or services automatically generated.

An exemplary system comprises a question database for storing and retrieving interview questions. The system also comprises an interview engine configured to selectively present some of the interview questions from the question database based at least in part on user selections, the interview engine further configured to receive answers from at least one interviewee specified by the user in response to presenting some of the interview questions. The system also comprises a compilation engine configured to compile the interview questions and corresponding answers received from the interviewee, the compilation engine further configured to assist the user to build online references for the user's products or services.

Another exemplary system comprises a question database for storing and retrieving interview questions. The system also comprises an interview engine configured to selectively present some of the interview questions from the question database based at least in part on user selections, the interview engine further configured to receive answers from at least one interviewee specified by the user in response to presenting some of the interview questions. The system also comprises a compilation engine configured to compile the interview questions and corresponding answers received from the interviewee into a recorded interview. The system also comprises a template engine configured to build online references for a user's products or services using the recorded interview.

BRIEF DESCRIPTION OF THE DRAWINGS

FIG. 2 is an exemplary browser interface which may be implemented for automated interview systems and methods.

FIGS. 2*a* and 2*b* are screenshots showing exemplary input/output that may be displayed automated interview systems and methods.

FIGS. 3-4 are flow charts showing exemplary operations which may be used to implement automated interview systems and methods.

DETAILED DESCRIPTION

Exemplary systems and methods are described for automating an interview collection process and creation of a corresponding web page. The systems and methods enable a user to have interviews automatically conducted, recorded and generated into compelling web pages with an unlimited number of interviewees after a one-time online setup process by the user. The user does not have to conduct the interview nor interact directly with the interviewees, nor does any other human being.

It should be appreciated that the interviews may be used by any type and number of user and end-user; and for any type and number of purposes. For purposes of illustration, exemplary interviews may include personal reference interviews (e.g. for employment, for college), customer feedback interviews (e.g. satisfaction surveys for internal and/or external use), educational institutions capturing interviews of current students. Of course these examples are merely illustrative and not intended to be limiting.

Although specific examples are given herein for purposes of illustration (e.g., audio and video interviews), it should also be appreciated that any type of media may be used for capturing, processing, and providing the interviews to the end-user.

Figure 1:
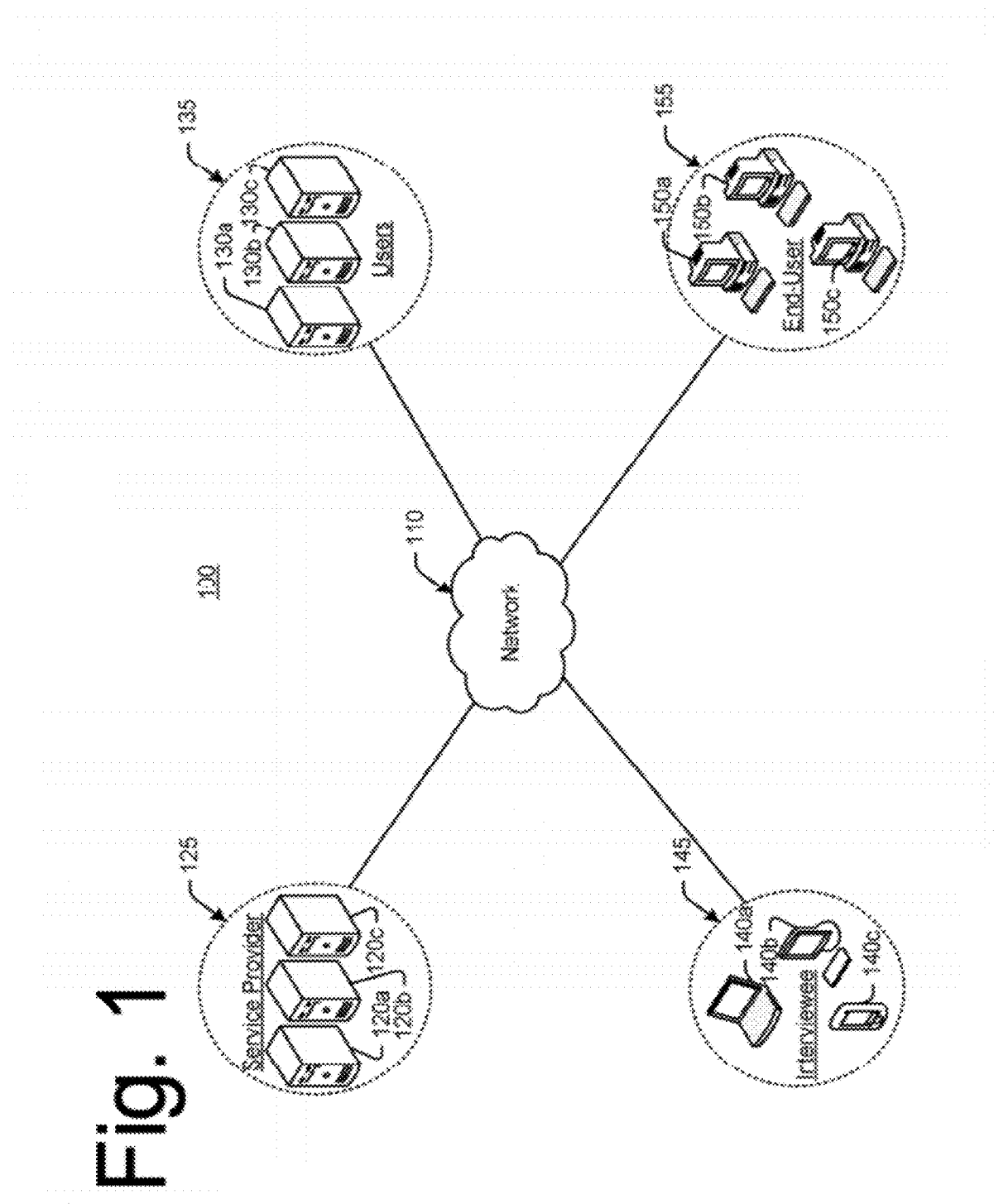
FIG. 1 is a high-level illustration of an exemplary networked computer system which may be implemented for automated interview systems and methods.

FIG. 1 is a high-level illustration of an exemplary networked computer system 100 (e.g., the Internet) which may be implemented for automated interview collection. The networked computer system 100 may include one or more communication networks 110, such as a local area network (LAN) and/or wide area network (WAN), for connecting one or more service provider 125, one or more users 135, one or more interviewees 145, and one or more end-users 155.

In an exemplary embodiment, a service provider 125 may be any entity that provides and maintains the automated interview collection. The service provider 125 serves as a proxy between the user(s) 135, the interviewee(s) 145, and the end-user(s) 155, by providing the technology and hardware/software services to implement automated interview collection.

A user 135 may be an individual or a business entity that offers products and/or services for sale and desires to post feedback in the form of interviews with past and/or present customers/consumers of the user 135 so that potential customers/consumers can receive references for the products and/or services before committing to become a customer/consumer themselves. Of course the systems and methods described herein are not limited to any particular implementation. For example, the user 135 may be a job application and use the systems and methods for personal references. Likewise, the systems and methods may be used by various other users 135 for customer feedback, and survey responses, to name only a few examples.

An interviewee 145 may be any individual or group of individuals that has had at least enough interaction with the user 135 so as to provide a competent or valid reference for the user's products and/or services. Of course the systems and methods are not limited to use with any particular type of interviewee 145. In exemplary embodiments, the user 135 may select the type of interviewees, and indeed, in some cases, the interviewee 145 may have had no personal interaction with the user 135.

An end-user 155 may be any individual, group, or organization desiring to become a customer/consumer of the user 135 but first wants to confirm the references of the user 135. Of course the systems and methods are not limited to use with any particular type of end-user 155. In exemplary embodiments, the user 135 may at least partially define the type of end-user 155 which may have access to the user's online-references. For example the user may define and/or limit access to personal interviews, such as when the user 135 is a job applicant and the personal interviews can only be accessed by potential employers that the user has given an access code. In other examples, the end-user 155 may be anyone with an interest in the interview recordings. For example, the end-user 155 may be a customer, employer, college or university looking at a student application, to name only a few examples.

The operations described herein may be implemented by host computers and client computers in the networked computer system 100. For purposes of illustration, host computers 120*a-c* are shown in the networked computer system 100 for a service provider 125. Also for purposes of illustration, client computers 130*a-c* are shown in the networked computers system 100 for a user 135, client computers 140*a-c* are shown for an interviewee 145, and client computers 150*a-c* are shown for an end-user 155 (e.g., potential consumers/customers who will be viewing the completed interviews). Of course, the computers and network described above is for purposes of example only. Any suitable device and/or network may be utilized (e.g., mobile devices, smart phones, etc. may be used with the systems and methods described herein on a mobile device carrier's network).

Host computers (or "hosts") may include one or more computing systems, such as a server with computer-readable storage. The hosts may be provided on the network 110 via a communication connection, such as a dial-up, cable, or DSL connection via an Internet service provider (ISP). The hosts may be accessed directly via the network 110, or via a network site. In an exemplary embodiment, the network site may also include a web portal on a third-party venue (e.g., a commercial Internet site), which facilitates a connection for one or more clients with host (e.g., via a back-end link). In another exemplary embodiment, portal icons may be provided (e.g., on third-party venues, pre-installed on computer or appliance desktops, etc.) to facilitate a direct link to the host.

Hosts may execute one or more host applications implemented in software, as described in more detail below. The hosts may also provide services to other computing or data processing systems or devices. For example, hosts may also provide transaction processing services, email services, etc.

The term "client" as used herein refers to a computing device through which the network 110 may be accessed. Clients may include any of a wide variety of computing systems, such as a stand-alone personal desktop or laptop computer (PC), workstation, personal digital assistant (PDA), or appliance, to name only a few examples. Each of the client computing devices may include memory, storage, and a degree of data processing capability at least sufficient to manage a connection to the network 110, either directly or indirectly. Client computing devices may connect to network 110 via a communication connection, such as a dial-up, cable, wireless device network, or DSL connection via an Internet service provider (ISP), to name only a few examples of communications connections. Still other communications connections now known or later developed may also be used.

Figure 1A:
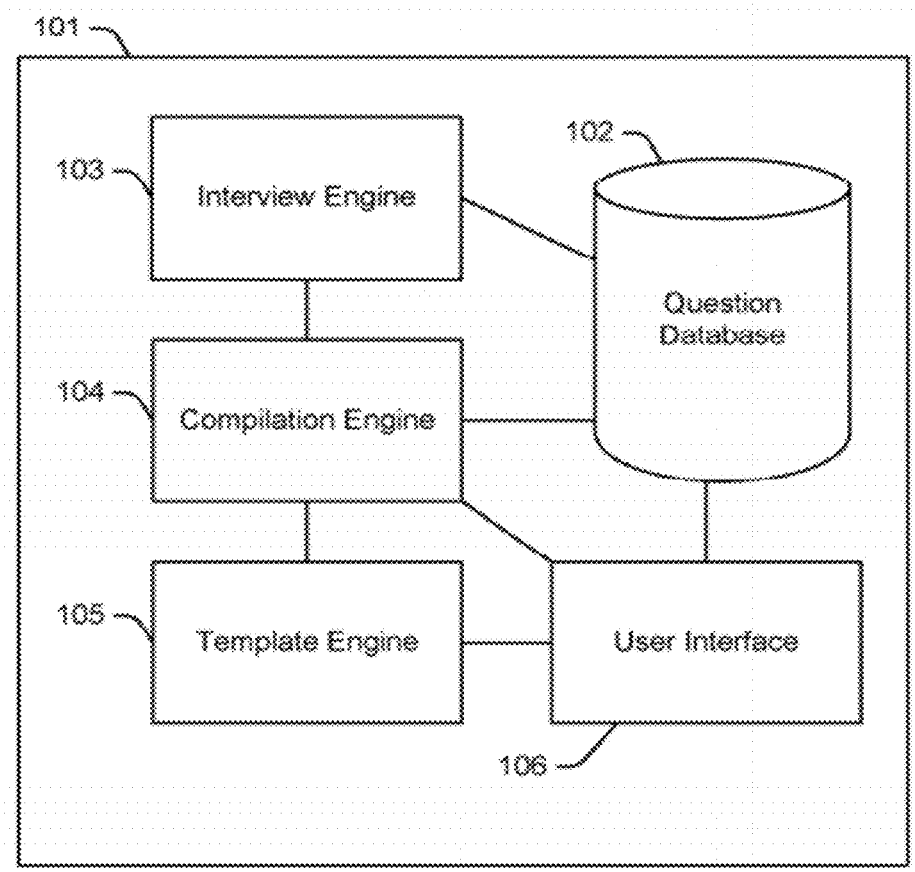
FIG. 1*a* is a block-diagram of an exemplary system.

FIG. 1*a* is a block-diagram of an exemplary interview system 101. For example, the interview system 101 may be implemented in program code executable by one or more processor or processing unit (e.g., as shown in FIG. 1). The exemplary interview system 101 comprises a question database 102 for storing and retrieving interview questions. The question database 102 may be populated with predetermined questions. The question database may also include at least one custom interview question created by the user.

The interview system 101 also comprises an interview engine 103 configured to selectively present some of the interview questions from the question database 102 based at least in part on user selections. The interview engine 103 may be further configured to receive answers from at least one interviewee specified by the user in response to presenting some of the interview questions. The interview system 101 also comprises a compilation engine 104 configured to compile the interview questions and corresponding answers received from the interviewee into a recorded interview. The system also comprises a template engine 105 configured to build online references for a user's products or services using the recorded interview.

It is noted that the terms "interview" and "recorded interview" are used herein to refer to any suitable type of interview in any suitable media and recorded/processed/provided to the end-user using any suitable format. Recorded interviews may include, for example, audio recordings, video recordings, written recordings (e.g., text files), transcriptions from one format to another, etc. In addition, the recorded interview may contain more than one of various types of media, such as, audio, video, text, photos, and/or graphics (e.g., a logo).

It should also be appreciated that the systems and methods described herein may be implemented in any language. Indeed, exemplary embodiments may provide foreign language support, such as translation services. For example, the user may select the language they want to present the interview questions in to the interviewee. So, even though the user might be an English speaker they might select Spanish and then the questions would be presented in Spanish to the interviewee. In an exemplary embodiment, the interviewee's answers may be provided for end-users in Spanish and/or translated back to English.

The exemplary interview system 101 may also include a user interface 106 configured to receive input from a user. For example, the user interface 106 may be operated by the user to identify the at least one interviewee. The user interface 106 may also be operated by the user for selecting the interview questions from the question database 102 by the user. The user interface 106 may also be implemented to interact with an administrator, interviewees, and in certain cases, with the end-users.

FIG. 2 is an exemplary browser interface 200 (e.g., Internet Explorer, Firefox Mozilla, etc.) which may be implemented for automated interview systems and methods. The browser interface enables operator (e.g., users 135 and interviewees 145) to interface with the software product as described in more detail below, e.g., to collect, generate, and manage interviews. The browser interface also enables operator (e.g., end-users 155) to interface with the software product as described in more detail below, e.g., to access the interviews.

In an exemplary embodiment, the browser interface 200 may be implemented as a graphical user interface (GUT) in a "windows-based" operating system environment (e.g., Microsoft Corporation's WINDOWS®), although the browser interface 200 is not limited to use with any particular operating system. The user may launch the browser interface 200 in a customary manner, for example, by clicking on an icon, selecting the program from a menu, or pressing a key on a keyboard.

The browser interface 200 supports operator interaction through common techniques, such as a pointing device (e.g., mouse, style), keystroke operations, or touch screen. By way of illustration, the operator may make selections using a mouse to position a graphical pointer and click on a label or button displayed in the browser interface 200. The operator may also make selections by entering a letter for a menu label while holding the ALT key (e.g., "ALT+letter" operation) on a keyboard. In addition, the user may use a keyboard to enter command strings (e.g., in a command window).

The browser interface 200 is displayed for the operator in a window, referred to as the "application window" 210, as is customary in a window environment. The application window 210 may include customary window functions, such as a Minimize Window button 211, a Maximize Window button 212, and a Close Window button 213. A title bar 220 identifies the application window 210 for the user (e.g., as "Internet Browser Window"). The application window 210 may also include a customary menu bar 230 having an assortment of pull down menus (e.g., labeled "File," "Edit," "View," "Go," "Bookmarks," "Tools," and "Help"), which are well-known in commercially available browser interfaces 200. For example, the operator may select a print function (not shown) from the "File" menu (designated herein as "File|Print").

Application window 210 also includes an operation space 240. Operation space 240 may include one or more graphics for displaying output and/or facilitating input from the operator. Although not shown, the graphics may also include, but are not limited to, subordinate windows, dialog boxes, icons, text boxes, buttons, and check boxes. Exemplary input/output for operation space 240 is described in more detail below with reference to FIGS. 2a and 2b.

FIGS. 2a and 2b are screenshots showing exemplary input/output that may be displayed automated interview systems and methods. The input/output enables the owner(s) to setup and manage one or more interviews. It is noted that the exemplary input/output is merely illustrative and not intended to be limiting. Other embodiments for input/output are also contemplated for implementing automated interview systems and methods, as will be readily apparent to those having ordinary skill in the art after becoming familiar with the teachings herein.

FIG. 2a is a screenshot showing an exemplary administrative console 250 as it may be displayed in the browser interface 200 for an administrator (e.g., a back-end user). This is the main operations area for the administrator(s), and may include a number of operations which may be implemented by selecting functional links. Exemplary functional links may include, for example, account management 251, reminders 252, testimonial configuration 253, interview tasks 254, site visits 255, and billing management 256. Selecting these functional links (or sub-links within a functional link) may display various operations which are available to the administrator, e.g., in window 260.

FIG. 2b is a screenshot showing an exemplary user website 270. This is the main operations area for users to configure and provide end-user screens for viewing by end-users. The user may access the user website 270 via a username/password to interact with the interview system 101. For example, the user may select a template, identify interviewees, select interview questions, review/edit/accept or reject recorded interviews, and otherwise manage/customize the user's account (e.g., upload the Customer Logo 271); and configure the end-user screens. An end-user may access the user website 270 to view/listen to recorded interviews 272a, 272b for the user's products and/or services on the end-user screen. It is noted that the user screens may appear similar to the end-user screens but with added functionality to configure the appearance of the user website 270 for the end-user screens, as is customary in website production.

Also shown in FIG. 2b is a configurable "call to action" or "special offer" button 275. Using the template during set-up, the user may enter any suitable text for the "special offer" button 275 which will appear on the button (e.g., the button may read "visit our website" or "get your free trial" instead of "special offer" as shown in FIG. 2b). The user may also associate the button 275 with a URL or pop-up window where the user may provide coupons or other special offers to the end-user.

The automated interview collection process may be described in more detail as comprising multiple aspects: (1) user sign-up, (2) interviewee initial contact, (3) interviewee records interview, (4) user review, (5) interview approvals, and (6) interview link creation. Although described herein as discrete components, it is understood that one or more of these aspects may be combined into a single aspect and/or one or more of these aspects may be further sub-divided. Each of these aspects will now be described in more detail with reference to the flow charts shown in FIGS. 3-4.

Figure 4:
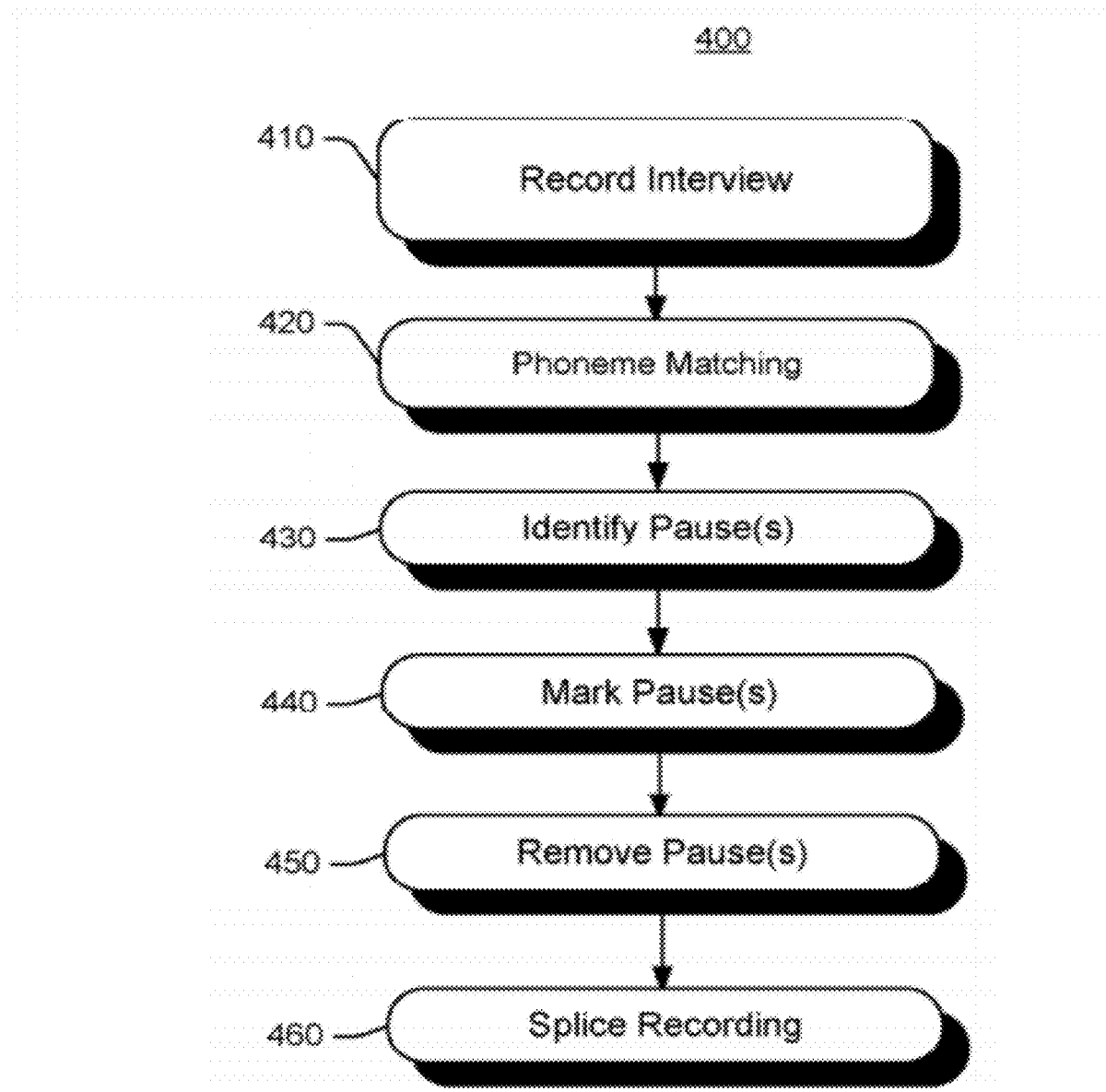

FIGS. 3-4 are flow charts showing exemplary operations which may be used to implement automated interview systems and methods. The operations may be embodied as logic instructions on one or more computer-readable medium. When executed on a processor, the logic instructions cause a general purpose computing device to be programmed as a special-purpose machine that implements the described operations. In an exemplary implementation, the components and connections depicted in the figures may be used.

FIG. 3 describes exemplary operations for automated interview collection and generation. In operation 310, the user signs up with the automated interview system. The user may sign up, e.g., online or via the phone to utilize the system. The user may provide their name, contact information, and payment information. In addition, the user may provide the names and contact information (e.g., an email address) for at least one interviewee that the user wishes to have interviewed. Additional interviewees may be added at any time. The user may also select questions they desire to be asked of the interviewees At block 311, the user may desire to select the ability for individuals who visit the user's web site to self identify themselves as prospective interviewees by submitting their contact information. At block 312, the user may select from multiple templates to designate how they would like the completed interviews formatted and made available to the end-users.

In operation 320, the system automatically contacts the interviewee(s), e.g., with an email describing how the interview process works. The email may contain a hyperlink with a unique identifier code specific to a user and the interviewee. If the interviewee does not click the link within a time frame specified by the user, then the system may automatically sends reminder emails at block 321, e.g., up to a maximum number of reminders as specified by the user.

In operation 330, the interviewee may be provided with instructions. For audio interviews, step by step instructions may be displayed including an explanation of the interview, who requested the interview, and a preview of questions that may be asked.

In operation 340, the interview is conducted. It is noted that the interview may be conducted by asking a single question and obtaining and/or processing a response to the question. Alternatively, the interview may be conducted by asking two or more questions at a time, and then compiling the individual answers. For example, the answers may be associated with the respective questions, or combined as a single response to a number of related questions.

At block 341 interviewee may be given the opportunity to upload a photo or other image to be associated with their interview. As noted at block 342, the interviews may be via phone, web-audio, web-video, appliance, and/or a combination of these and/or other automated methods for conducting interviews. The interviewee may also select the type of interview.

For phone-based interviews, the interviewee is given a phone number to call and given their unique identifier number. An interactive voice response system again explains the process. The system takes the interview questions entered by the user and (e.g., using voice to text technology) converts the questions for play through the interactive voice response system. The interviewee is asked the first interview questions by the system. The interviewee answers the first question over the phone and the system records their answer.

When each question is completed, the interviewee may press a specified key on their phone. The interviewee is given an option to review their recording and to re-record it if they do not like it. The next question is then asked of the interviewee and the process is repeated until all questions are asked and answered. Recorded audio files are automatically loaded into the Invention for review by user.

For a web-based interview, the interviewee is reminded to turn their speakers and microphone on in their computer or the video camera if a video interview, and to click a designated button within the system. A brief verbal explanation of the process is played to interviewee. The system takes the interview questions entered by the user and (e.g., using voice to text technology) converts the questions for play through the interactive voice response system. The interviewee is asked the first interview questions by the system. The interviewee answers the first question in their computer microphone and the system records the answer.

When the interviewee is finished answering the questions, they click an "end", "stop" or similar button online. The interviewee is given an option to review their recording and to re-record it if they do not like it. The next question is then asked of the interviewee, and the process is repeated until all questions are asked and answered.

For video interviews, step-by-step instructions are displayed, including an explanation of the interview, who requested the interview, and a preview of questions that will be asked. The interviewee is given the opportunity to upload a photo or other graphic image to be associated with their interview. Of course, photo upload may also be implemented for other interview types (e.g., audio interviews). The interviewee chooses between a web based or appliance based interview For web-based video interviews, the interviewee is reminded to turn their speakers, camera and microphone on in their computer and clicks a designated button within the system. A brief verbal explanation of the process is played to interviewee. The system takes the interview questions entered by the user and (e.g., using voice to text technology) converts them for play through the interactive voice response system.

The interviewee is then asked the first interview questions. The interviewee answers the first question using their computer camera and microphone and the Invention records their answer. When they are completed answering they click an "end", "stop" or similar button online in the Invention. The interviewee is given an option to review their recording and to re-record it if they do not like it. The next question is then asked of the interviewee and the process is repeated until all questions are asked and answered.

For appliance-based video interviews, the interviewee is asked to provide shipping information for a pre-programmed appliance to be sent to them. A pre-programmed appliance (e.g., a laptop, hand held device or other such device) is mailed to the interviewee. When powering on the device the interviewee is provided step by step instructions of how to utilize the device. The device plays the interview questions and prompts the interviewee to respond. When the interviewee is completed answering, they click an "end", "stop" or similar button online in the device. The interviewee is given an option to review their recording and to re-record it if they do not like it. The next question is then asked of the interviewee and the process is repeated until all questions are asked and answered.

When completed, the interviewee either ships the device back to the designated address. In an alternative embodiment, the device is simply connected to the Internet and the video interview is uploaded to the invention. The interviewee may then keep the device as a gift or be asked to mail it back.

In operation 350, the interview is generated. For example, the interview may be generated by compiling the questions/answers from the interview into a data file. The system automatically merges the information entered by the user about the interviewee (e.g., the interviewee's name, company, title, location, etc.) together with any graphic files uploaded by the interviewee and the recorded audio or video files from the interview.

The audio/video files may be broken out separately into question and answer sets. The questions may displayed as links where the interviewee's answers can be played by clicking on a corresponding icon. In one embodiment the system uses text to voice technology to automatically add audio of the interview question being asked to the beginning of each answer of the interviewee. In another embodiment, the questions are pre-recorded (e.g., by the user) and the recording (e.g., of the user's interview questions) is used. This information and multimedia files are combined "on the fly" by the system to create a web page using the template selected by the user.

At block 351, the system may automatically scan the audio files and edit out audible delays (e.g., "ums", "ahs" and other "filler" language) that detract from the interview. This feature may be enabled by matching the pattern of such language with target words, and then selecting a start and stop point to cut out these delays and filler language. An exemplary embodiment for implementing automated verbal pause removal is described in more detail below with reference to FIG. 4. Of course, the automatic editing may also be implemented to automatically scan for profanity or other flagged words or phrases, which can then be removed, "bleeped," flagged (e.g., portions or the entire interview may be flagged) for human review.

At block 352, the system may automatically convert any text files to voice, e.g., using text-to-speech software.

In operation 360, the system notifies the user (e.g., via email) that there is a completed interview to review. The user may click on a link in the email and is taken to a review area where the system presents the user with a display of how the completed interview will appear online including any uploaded graphics and all recorded audio/video from the interview.

In operation 370, the user may review/edit/accept or reject the interview. For example, the user may review the interview and selectively decide whether to exclude any of the questions and the corresponding recorded answers of the interviewee. In an exemplary embodiment, the user can utilize an online editing tool provided by the system to custom edit the audio or video files for each answer provided by the interviewee. The user by then chooses whether to approve the interview for use or delete the entire interview.

In an exemplary embodiment, a final approval may be required by the interviewee. For example, after editing and approval of the interview by the user, an email is sent to the interviewee with a hyperlink containing a unique identifier. The interviewee clicks on the link and the template containing the interview is displayed. The interviewee can then listen or view the interview and is then asked to click a button to approve the interview.

In operation 380, the system transfers the interview content (e.g., as approved by the user) to the user site; and the system makes the interview available to end-users in operation 390. For example, the system generates a hyperlink with a unique identifier code for use by the user. The user may utilize this link on web pages and marketing materials to provide access to the interview. In an exemplary embodiment, the system automatically generates a summary page listing all the interviews that the user has completed with interviewees and a link to each of those completed interviews. In another embodiment, the interviewee is provided with a single unique identifier for approved interviews and they may specify a secondary unique identifier for each completed interview such that the link to the interview may use the format of:

http:///www.whateverdomain.com/Invention-provided-unique-Identifier/User-provided-interview-unique-identifed/

FIG. 4 describes exemplary operations for automated verbal pause removal in audio recordings. At operation 410, a digital recording of the Interviewee is conducted. The digital file may be processed in operations 420 and 430 by audio voice recognition software which is tuned to be dealing with a small vocabulary of verbal pauses (e.g., "um", "ahh", etc.) but from a large variety of individuals (e.g., a broad range of accents). Phoneme profiles may be housed in a verbal pause library that includes the digital phoneme profiles of verbal pauses in a variety of accents and other audible variations. An exemplary embodiment may implement a library of phonemes for verbal pauses for any variety of languages.

Phoneme matcher software examines phonemes in the recording in the context of the other (e.g., adjacent) phonemes, similarly to commercially available voice recognition software. The phoneme matcher executes the contextual phoneme plot through any suitable statistical modeling and compares these to the library of phonemes for verbal pauses. However, the routine varies from commercially available software in that it not only identifies verbal pause phoneme combinations but also determines the points at which the user was with high probability verbalizing a verbal pause. This may be accomplished by identifying a verbal pause phoneme (or combination) and then statistically comparing it to any adjacent phoneme. If the combination does not create a known word then a verbal pause may be identified. In addition, the routine also identifies instances where a verbal pause phoneme (or combination) occurs next to silence on both sides of the verbal pause.

In operation 440, when a verbal pause phoneme (or combination) is identified the software initiates the companion Digital Marker software. The software inserts a uniquely identifiable digital series immediately before and/or after the identified verbal pause in the audio file.

In operations 450 and 460, after the verbal pauses have been marked, the audio file is run through Digital Splicer software which searches for the digital marks and deletes all data between and including the digital marks, thereby removing the verbal pauses from the audio file.

The operations shown and described herein are provided to illustrate exemplary implementations of automated interview collection. It is noted that the operations are not limited to the ordering shown. Still other operations may also be implemented.

In addition to the specific implementations and embodiments explicitly set forth herein, other aspects and implementations will be apparent to those skilled in the art from consideration of the specification disclosed herein. It is intended that the specification and illustrated implementations be considered as examples only.

The invention claimed is:

1. A method comprising:
selectively presenting interview questions based on user input to at least one interviewee identified by a user, and receiving answers from the at least one interviewee in response to presenting the interview questions;
automatically compiling the interview questions and received answers as a recorded interview to provide online references for the user's products or services; and
editing the recorded interview, wherein editing the recorded interview further includes automatically scanning the audio files to edit out audible delays that detract from the recorded interview, and wherein editing the recorded interview includes identifying delay language in the recorded interview.

2. The method of claim 1 further comprising contacting the interviewee initially and with a predetermined number of reminders.

3. The method of claim 1 further comprising requiring user approval of the recorded interview before making the recorded interview available to end-users.

4. The method of claim 1 wherein editing the recorded interview includes matches a pattern of delay language with target words, selecting a start and stop point identifying the delay language, and removing the delay language from the recorded interview.

5. The method of claim 4 further comprising splicing uncut portions of the recorded interview with the delay language removed.

6. The method of claim 1 further comprising associating a unique identifier with the interviewee tracking questions and answers for the interviewee.

7. A system comprising:
a question database for storing and retrieving interview questions;
an interview engine configured to selectively present some of the interview questions from the question database based at least in part on user selections, the interview engine further configured to receive answers from at least one interviewee specified by the user in response to presenting some of the interview questions;
a compilation engine configured to compile the interview questions and corresponding answers received from the interviewee, the compilation engine further configured to assist the user to build online references for the user's products or services; and wherein the compilation engine is further configured for editing an interview, and wherein the compilation engine matches a pattern of delay language with target words, and then selects a start and stop point to cut out delays and filler language.

8. The system of claim 7 wherein the interview engine is further configured for user sign-up, interviewee initial contact, interview recording.

9. The system of claim 7 wherein the compilation engine is further configured for user review of the recorded interview, user approval of the recorded interview, and interview presentation to an end-user.

10. The system of claim 7 wherein the compilation engine automatically scans audio files for the recorded interview and edits portions of the recorded interview that otherwise detract from the recorded interview.

11. The system of claim 7 wherein the compilation engine is further configured to display a plurality of user screens based at least in part on the recorded interview, the plurality of user screens assisting the user to at least partially customize the plurality of user screens to build the online references.

12. The system of claim 11 wherein the plurality of user screens assists the user as part of an integrated product to manage the online references.

13. The system of claim 7 wherein the compilation engine is further configured to display a plurality of end-user screens including at least the recorded interview, the plurality of end-user screens displaying a special offers button.

14. A system comprising:
a question database for storing and retrieving interview questions;
an interview engine configured to selectively present some of the interview questions from the question database based at least in part on user selections, the interview engine further configured to receive answers from at least one interviewee specified by the user in response to presenting some of the interview questions;
a compilation engine configured to compile the interview questions and corresponding answers received from the interviewee into a recorded interview;
wherein the compilation engine is further configured for editing an interview, and wherein the compilation engine matches a pattern of delay language with target words, and then selects a start and stop point to cut out delays and filler language; and
a template engine configured to build online references for a user's products or services using the recorded interview.

15. The system of claim 14 further comprising a user interface for:
identifying the at least one interviewee by the user; and
selecting the interview questions from the question database by the user; and
wherein the question database further includes at least one custom interview question created by the user.

* * * * *